(12) United States Patent
Elejalde et al.

(10) Patent No.: US 10,059,530 B2
(45) Date of Patent: Aug. 28, 2018

(54) SYSTEM FOR COLLECTING CONFECTIONARY PRODUCT

(71) Applicant: INTERCONTINENTAL GREAT BRANDS LLC, East Hanover, NJ (US)

(72) Inventors: Cesar Carlos Elejalde, Whippany, NJ (US); Arthur William Upmann, Loves Park, IL (US); Eric Mecrin, Saint-Genest d'Ambiere (FR); Miles J. van Niekerk, Whippany, NJ (US); Michael Hammes, Loves Park, IL (US); Matthew Sagendorf, Byron, IL (US); Marc Degady, East Hanover, NJ (US)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 0 days.

(21) Appl. No.: 15/107,820

(22) PCT Filed: Dec. 23, 2014

(86) PCT No.: PCT/US2014/072106
§ 371 (c)(1),
(2) Date: Jun. 23, 2016

(87) PCT Pub. No.: WO2015/100303
PCT Pub. Date: Jul. 2, 2015

(65) Prior Publication Data
US 2016/0318716 A1  Nov. 3, 2016

Related U.S. Application Data

(60) Provisional application No. 61/920,537, filed on Dec. 24, 2013.

(51) Int. Cl.
*B65G 1/00* (2006.01)
*B65G 47/31* (2006.01)
(Continued)

(52) U.S. Cl.
CPC ............. *B65G 47/31* (2013.01); *B65G 15/50* (2013.01); *B65G 17/34* (2013.01); *B65G 17/46* (2013.01);
(Continued)

(58) Field of Classification Search
CPC . B65G 1/00; B65G 1/02; B65G 1/023; B65G 1/026; B65G 47/515; B65G 47/5154
(Continued)

(56) References Cited

U.S. PATENT DOCUMENTS 4,964,498 A  10/1990 Klingl
5,176,242 A  1/1993 Wegscheider
(Continued)

FOREIGN PATENT DOCUMENTS

DE  3618904 A1  12/1987
DE  19616640 A1  11/1997
(Continued)

OTHER PUBLICATIONS

International Search Report; International Application No. PCT/US2014/072106; International Filing Date: Dec. 23, 2014; dated Apr. 13, 2015; 4 Pages.
(Continued)

*Primary Examiner* — James R Bidwell
(74) *Attorney, Agent, or Firm* — Cantor Colburn LLP

(57) ABSTRACT

Disclosed is a system for processing confectionary product, the system includes a collecting device disposed in line with at least one upstream confectionary production station disposed upstream of the collecting device and at least one downstream confectionary production station disposed downstream of the collecting device. At least one conveying device is configured to convey the confectionary product from the at least one upstream confectionary production station to the collecting device, receive the confectionary
(Continued)

product from the collecting device, and convey the confectionary product to the at least one downstream confectionary production station. The collecting device is configured to collect confectionary product from the conveying device while the at least one upstream confectionary station is operational and the at least one downstream confectionary production station is non-operational.

26 Claims, 6 Drawing Sheets

(51) Int. Cl.
B65G 47/51 (2006.01)
B65G 15/50 (2006.01)
B65G 17/34 (2006.01)
B65G 17/46 (2006.01)
B65G 37/00 (2006.01)
B65G 43/10 (2006.01)

(52) U.S. Cl.
CPC ............ B65G 37/005 (2013.01); B65G 43/10 (2013.01); B65G 47/5181 (2013.01); B65G 2201/0202 (2013.01); B65G 2201/0205 (2013.01); B65G 2811/0631 (2013.01)

(58) Field of Classification Search
USPC .......................................... 198/347.1, 347.3
See application file for complete search history.

(56) References Cited

U.S. PATENT DOCUMENTS

| | | | |
|---|---|---|---|
| 5,569,472 A | | 10/1996 | Cerboni |
| 5,680,923 A | | 10/1997 | Gram |
| 6,098,379 A | | 8/2000 | Spatafora et al. |
| 6,135,705 A | * | 10/2000 | Katoch ................ B65G 57/308 198/461.3 |
| 8,905,221 B2 | * | 12/2014 | Young .................. B65G 57/308 198/347.1 |
| 9,199,791 B2 | | 12/2015 | Pietsch |
| 9,296,567 B2 | | 3/2016 | Hammacher et al. |
| 2004/0050657 A1 | * | 3/2004 | Langenegger ..... B65G 47/5131 198/347.1 |
| 2010/0080673 A1 | * | 4/2010 | Von Der Waydbrink ................... C23C 14/568 198/347.1 |
| 2012/0237633 A1 | | 9/2012 | Olejarski et al. |
| 2015/0158677 A1 | * | 6/2015 | Philipp ................ B65G 47/643 198/347.1 |

FOREIGN PATENT DOCUMENTS

| | | | |
|---|---|---|---|
| EP | 0413075 A1 | 2/1991 | |
| EP | 0855142 A2 | 7/1998 | |
| EP | 1674413 A1 | 6/2006 | |
| EP | 1980508 A1 | 10/2008 | |
| EP | 2050342 A1 | 4/2009 | |
| GB | 2305647 A | 4/1997 | |
| JP | 2-225210 | * 9/1990 | ............... B65G 1/07 |
| JP | H04229144 A | 8/1992 | |
| JP | 2002516672 A | 6/2002 | |
| JP | 2007230604 A | 9/2007 | |
| WO | 2013013046 A2 | 1/2013 | |

OTHER PUBLICATIONS

Written Opinion of the International Searching Authority; International Application No. PCT/US2014/072106; International Filing Date: Dec. 23, 2014; dated Apr. 13, 2015; 5 Pages.
Notification of Reasons for Refusal; Japanese Application No. 2016-537533; dated Apr. 27, 2017; 19 Pages.
Office Action and Search Report; Russian Application No. 2016116850; dated May 2, 2017; 13 Pages.
Notification of First Office Action; Chinese Application No. 201480068860.7; dated Feb. 28, 2017; 17 Pages.
Notification of Second CN Office Action with Translation; Chinese Application No. 201480068860.7; dated Oct. 10, 2017; 16 Pages.
Russian Non-Final Office Rejection Decision with Translation; Russian Application No. 2016116850; dated Sep. 11, 2017; 11 Pages.
Japanese Final Office Action with English Translation; JP Application No. 2016-537533; dated Dec. 12, 2017; pp. 1-9.
Notification of Third CN Office Action with Translation; Chinese Application No. 201480068860.7; dated Mar. 30, 2018; 13 Pages.

* cited by examiner

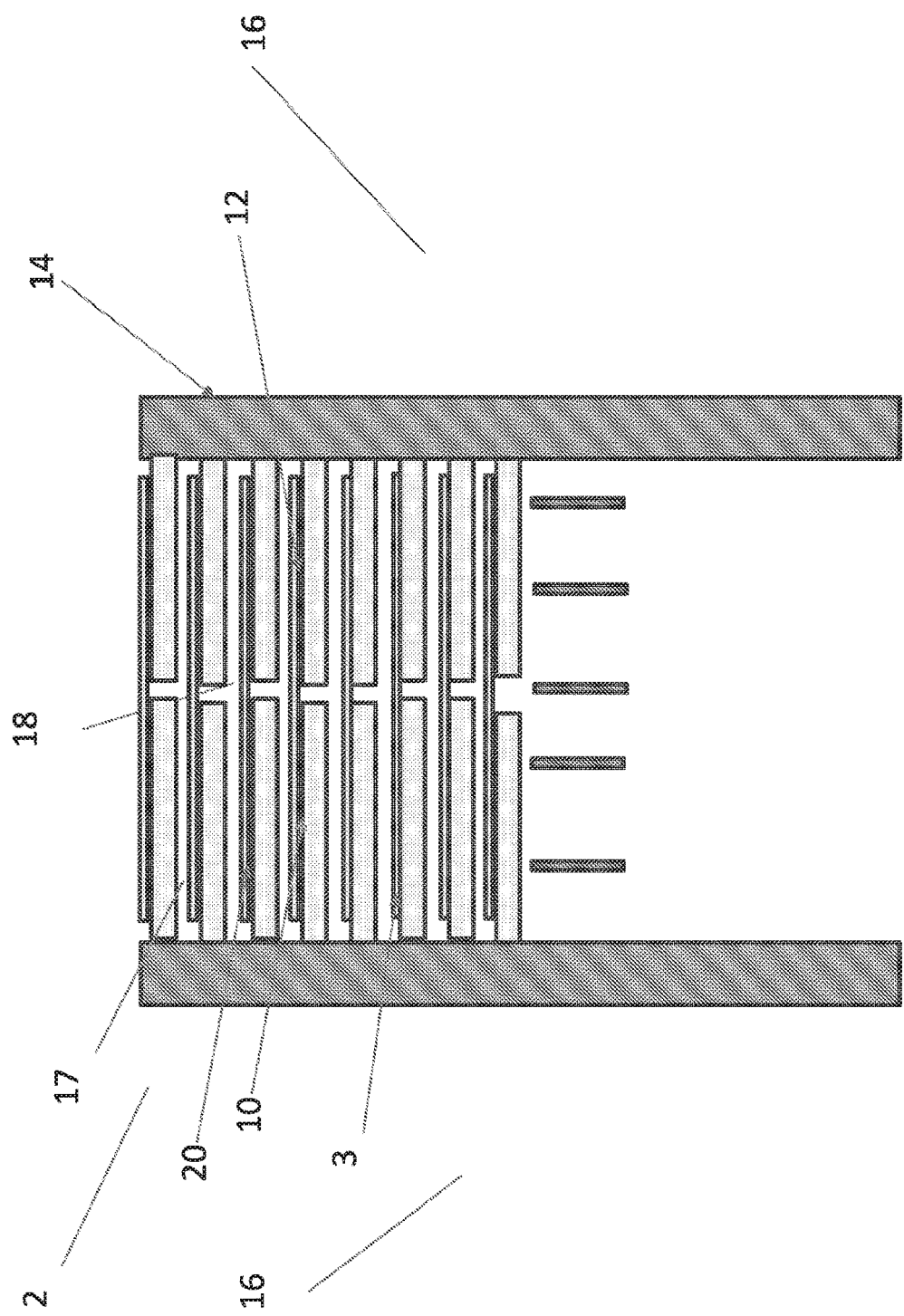

SYSTEM FOR COLLECTING CONFECTIONARY PRODUCT

CROSS REFERENCE TO RELATED APPLICATIONS

This application is a National Stage application of PCT/US2014/072106, filed Dec. 23, 2014, which claims the benefit of U.S. Provisional Application No. 61/920,537, filed Dec. 24, 2013, both of which are incorporated by reference in their entirety herein.

FIELD

The disclosure relates generally to a system for collecting, and more particularly to a system for collecting and dispensing confectionary product.

BACKGROUND

Conventional confection or chewing gum production methods may experience slowdowns or even production halts due to operational interruptions caused by production equipment, supply limitations, or operator error. Such slowdowns or halts can be problematic, particularly for inline continuous production methods due to loss of production upstream of the production interruption, and time lost due to resuming procedures.

Accordingly, a system for collecting and dispensing that is capable of collecting product while interruptions are addressed, and then dispensing the collected product when production resumes would be desirable.

SUMMARY

Disclosed is a system for processing confectionary product, the system including a collecting device disposed in line with at least one upstream confectionary production station disposed upstream of said collecting device and at least one downstream confectionary production station disposed downstream of said collecting device; and at least one conveying device configured to convey the confectionary product from said at least one upstream confectionary production station to said collecting device and to receive the confectionary product from said collecting device, and convey the confectionary product to said at least one downstream confectionary production station, wherein said collecting device is configured to collect confectionary product from said conveying device while said at least one upstream confectionary station is operational and said at least one downstream confectionary production station is non-operational.

Further disclosed is a method for processing confectionary product, the method including providing a collecting device, at least one upstream confectionary production station disposed upstream of said collecting device, and at least one downstream confectionary production station disposed downstream of said collecting device; conveying the confectionary product from said at least one upstream confectionary production station to a collecting device via at least one conveying device; and collecting confectionary product from said at least one conveying device in said collecting device while said at least one upstream confectionary production station is operational, and while at least one downstream confectionary production station is non-operational.

Further disclosed is a system for processing gum, the system including a collecting device disposed in line with a forming device configured to form gum into a continuous sheet of final gum thickness and divide said continuous sheet into individual sheets and at least one downstream confectionary production station configured to score or package said individual sheets; and at least one conveying device configured to convey the gum from said forming device to said collecting device, receive the gum from said collecting device, and convey the gum from said collecting device to said at least one downstream confectionary production station, wherein said collecting device is configured to collect gum from said conveying device while said forming device is operational and said at least one downstream confectionary production station is non-operational.

BRIEF DESCRIPTION OF THE FIGURES

The accompanying drawings incorporated in and forming a part of the specification embodies several aspects of the present invention and, together with the description, serve to explain the principles of the invention. In the drawings:

FIG. 6 is a schematic front side elevation view of a collecting station such as that shown in FIG. 2 with the maximum capacity of confectionary product collected.

DETAILED DESCRIPTION

Figure 1:
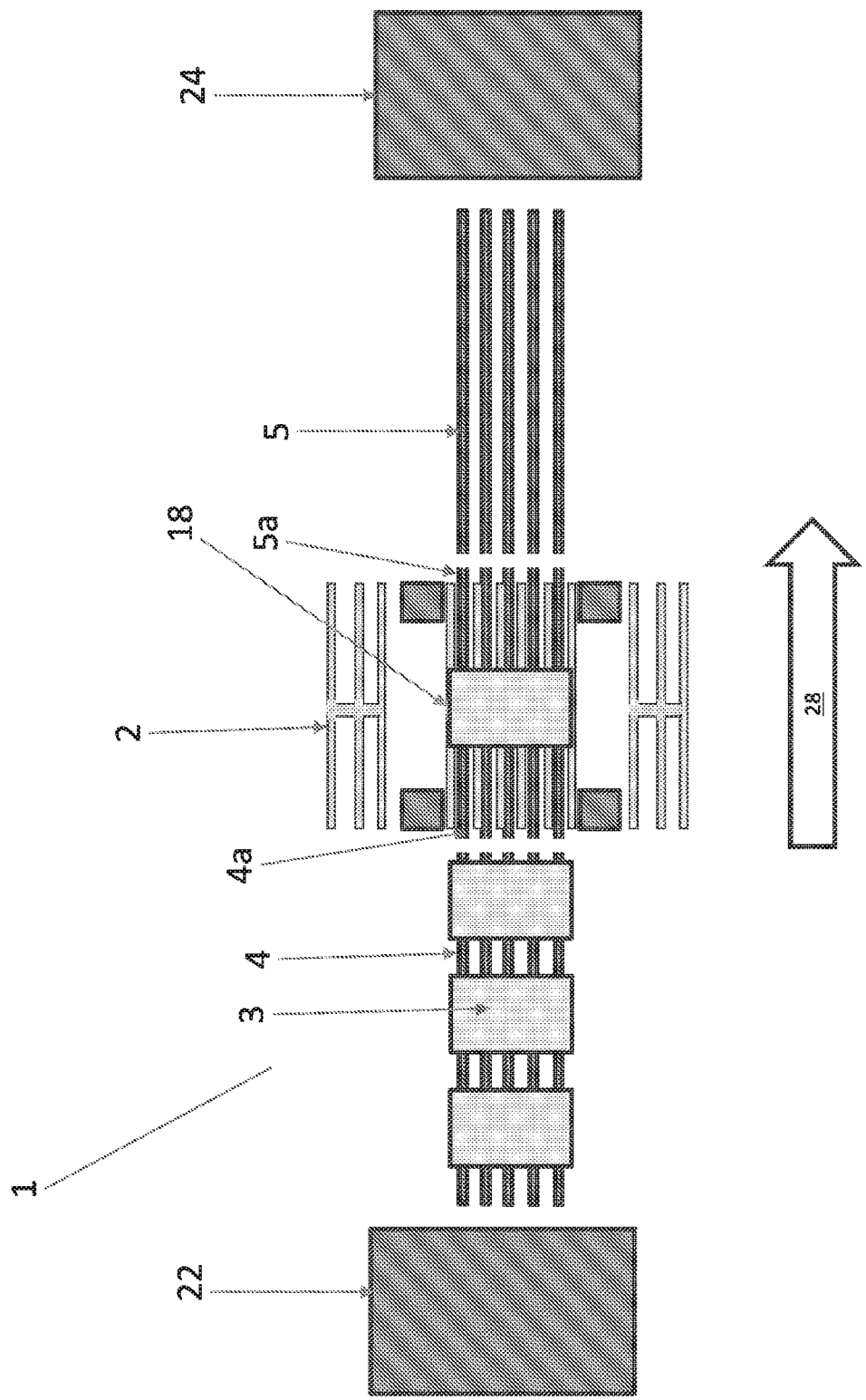
FIG. 1 is a schematic upper plan view of a confectionary production system in accordance with an exemplary embodiment with a cross section of the frame shown for clarity.
Figure 2:
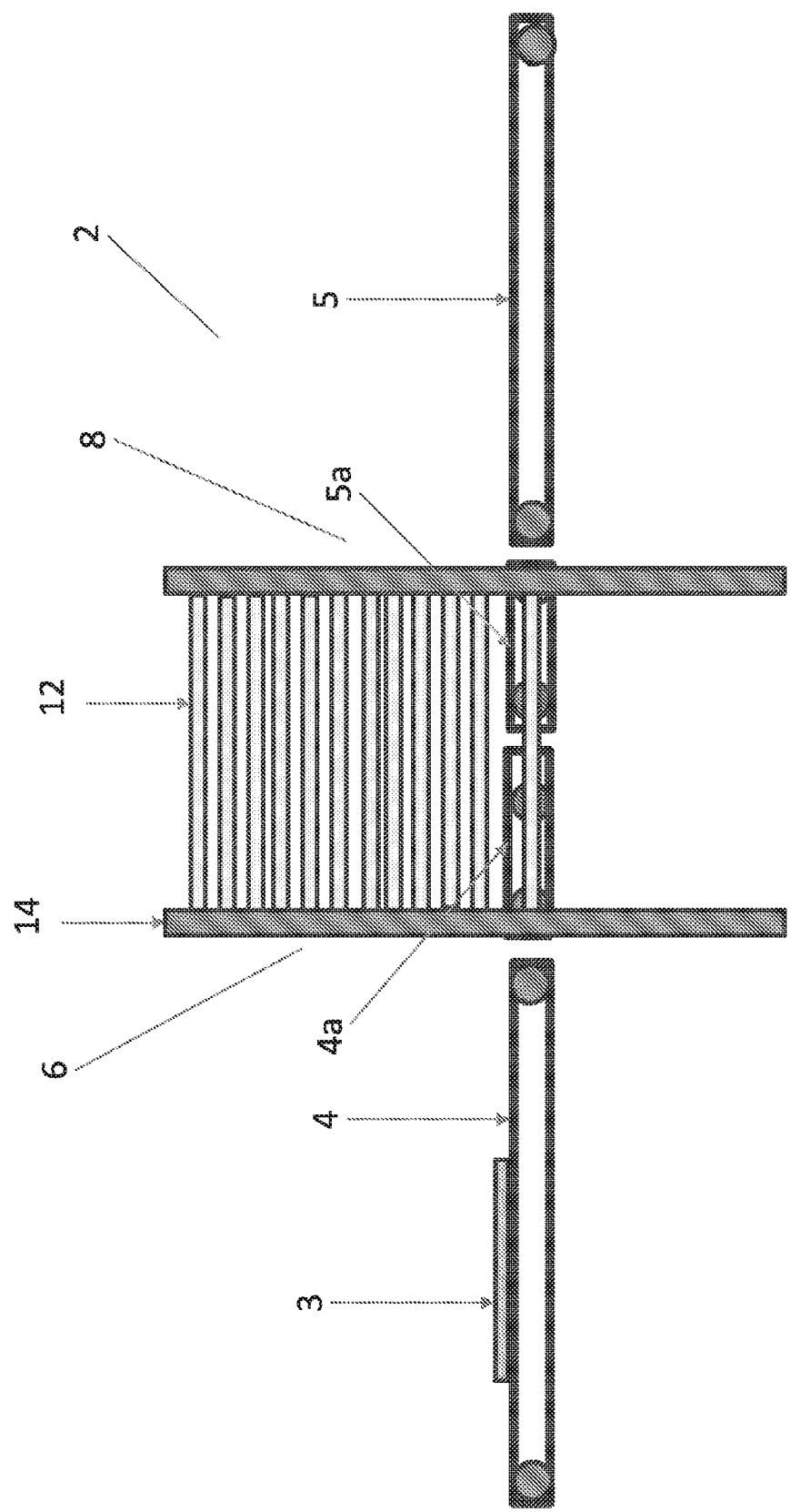
FIG. 2 is a schematic right side elevation view of a collecting station with select trays removed for clarity in accordance with an exemplary embodiment.
Figure 3:
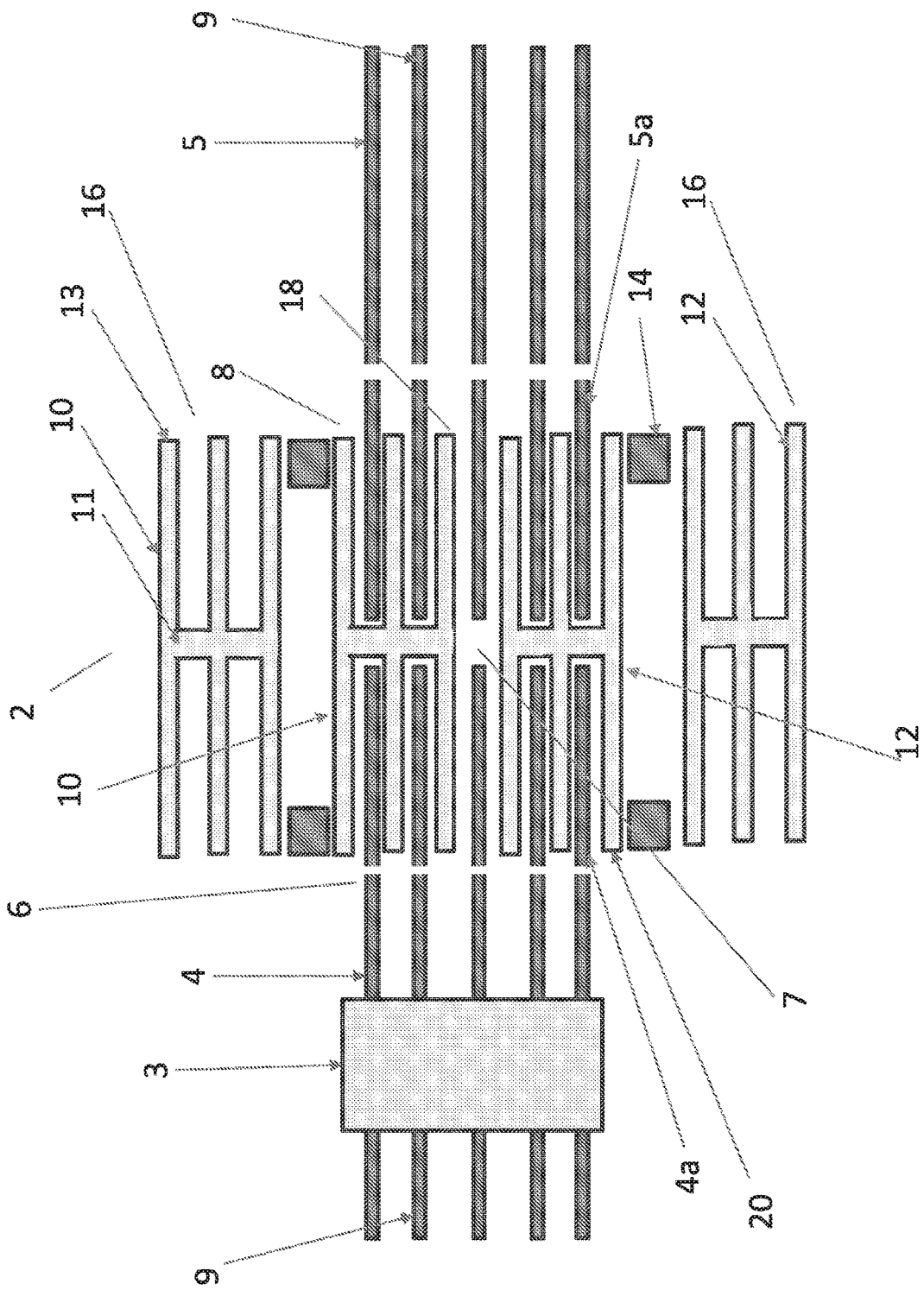
FIG. 3 is a schematic upper plan view of a collecting station with a cross section of the frame shown and select trays removed for clarity such as that shown in FIG. 2.

The following disclosure will detail particular embodiments according to the present invention, which provides systems for collecting, and more particularly systems for collecting and dispensing confectionary product. Reference is now made to the drawings, wherein like reference numerals are used to refer to like elements throughout the disclosure.

Referring to FIGS. 1-6, a system 1 for processing confectionary product is illustrated. The system 1 includes a collecting station 2 disposed in line with upstream confectionary product station(s) 22 and downstream confectionary product station(s) 24. As will be discussed below, the collecting station 2 is configured to collect confectionary product 3 from the upstream confectionary product station 22 while the downstream confectionary product station 24 is non-operational (i.e. halted or slowed). Via such collecting, it is possible to continue processes in the upstream confectionary product station 22 when processes in downstream confectionary product station 24 are non-operational. In an exemplary embodiment, product 3 is transported from the upstream station 22 to the collecting station 2 via conveying devices 4, 4a, and from the collecting device 2 to the downstream station 24 via conveying devices 5, 5a.

The confectionary product 3 transported through the system 1 may be any desirable confectionary product, such as but not limited to chewing gum, candy, cookies, cakes, biscuit, etc. While any confectionary product may be used in the system 1 as described, use of the system 1 is of particular benefit to the processing of chewing gum (referred to as "chewing gum" or "gum" within the description). Chewing gum as used herein includes, but is not limited to, compositions ranging from and inclusive of compounded elastomer to finished gum, which may include compounded elastomer in addition to some compounding aids, master batch gum base, compounded elastomer in addition to some subsequent gum ingredients, compounded elastomer in addition to some gum base ingredients and some subsequent gum ingredients, gum base, gum base in addition to some subsequent gum ingredients, master batch finished gum, and finished gum. The chewing gum 3 may be formed from a continuous sheet into individual sheets, particularly individual separated sheets, for processing in the system 1. Certain compositions of chewing gum 3 may be soft, flexible, or foldable, requiring that the chewing gum 3 be evenly supported during transportation to limit damage and reforming of the chewing gum 3. The chewing gum 3 may be mixed, dusted, conditioned, cooled, or otherwise processed during the production process.

With the system 1 having now been introduced and the confectionary product 3 having been discussed, the configuration of the system elements and product passing therethrough will be discussed in greater detail. As shown in FIG. 1, collecting station 2 may be disposed at any position in the system 1 upstream of confectionary product stations, processes, or areas (represented numeral 24 in the Figures) susceptible to an operational interruption or a non-operational condition, or in any other location where confectionary product 3 may need to be temporarily collected and later deposited. Collecting station 2 may be used with inline systems and other systems where confectionary product 3 moves in a direction of product flow 28. In certain embodiments, collecting station 2 can be used in conjunction with and in between forming processes, cooling processes, and packaging processes. In an exemplary embodiment, processes conducted at upstream confectionary production stations 22 may include extruding, forming, and/or cutting, while processes at downstream confectionary production stations 24 may include additional cutting, cooling, and/or packaging.

During the production process, operational interruptions may arise, slowing down or even halting production downstream of the operational interruption. Operational interruptions may have relatively short event durations before resolution. For example, jams may be resolved in less than 20 seconds, with greater than 80% of operational interruption events may generally being resolved in less than 2 minutes. That being said, operational interruptions may have a significant impact on continuous production processes that are conducted inline since operational upstream confectionary product stations or processes 22 may have to be slowed or halted in response to operational interruptions and non-operational conditions of downstream confectionary product stations or processes 24. For example, halted product stations or processes may require approximately 10 to 15 minutes to resume the halted production process, while creating large amounts of scrap and unusable material during that time.

For purposes of this disclosure, an "inline" system is designed as a system wherein confectionary product 3 can be transported in a product flow 28 from one element or device without having to be removed from the production line. That is, in an inline system such as system 1, the confectionary product 3 may not have to be removed or taken remote of system 1 for necessary processing. While this allows greater production speed, volume, and efficiency relative to conventional processes wherein the confectionary product 3 may need to be removed from the production line, operational interruptions may cause more significant impacts on upstream processes 22 in an inline system.

During the production process, regardless of whether the downstream production station 24 is operational or non-operational, the confectionary product 3 is transported to the collection space 7 of the collecting station 2 by the conveying device 4,4a and from the collection space 7 by conveying device 5a, 5. In a system such as system 1 that includes the collecting device 2, when an operational interruption downstream of collecting station 2 in downstream confectionary product station 24 occurs and it is determined that the flow 28 of confectionary product 3 must be slowed or halted to resolve the operational interruption, collecting station 2 will begin collecting confectionary product 3 from the upstream station 22 via conveying device 4, 4a, 5a. During the collection process, operational upstream confectionary product station or process 22 upstream of collecting station 2 may continue to operate normally or alternatively at reduced speed. In at least one embodiment, the speed of upstream confectionary product stations or processes 22 upstream of collecting station 2 can be reduced from normal speed to half of normal speed, though this is not necessary. After the operational interruption downstream of collecting station 2 in downstream confectionary product station or process 24 is resolved, the confectionary product 3 collected may be reintroduced onto conveying device 4a, 5a, 5 and to further downstream confectionary product stations or processes 24, generally. During reintroduction, the collected confectionary product 3 in the collecting station 2 is typically interspersed with the uncollected confectionary product 3 coming from the now operational upstream station 22 until the collecting station 2 is empty. During this time, the upstream station 22 operates at lower rate than the downstream station 24, with operation in the upstream station desirably being at 50% or less of upstream production when the collecting station 2 is not in an unloading condition.

Activation of the collecting station 2 for collection and deposition is contingent upon the operative conditions downstream of collecting station 2. Operative conditions in processes located downstream of collecting station 2 in downstream confectionary product stations or processes 24 may be monitored by any method or device known in the art, including but not limited to operator observation, equipment status, or electronic visual tracking of the confectionary product 3.

At least one conveying device moves the confectionary product 3 from upstream process 22 through collecting station 2 to downstream process 24. In various embodiments, collecting system 2 may utilize a single conveying device, two conveying devices, four conveying devices, or any other suitable number of conveying devices. In an exemplary embodiment, collecting system 2 utilizes four conveying devices 4, 4a, 5a, and 5. As an overview, during normal operating conditions the conveying devices 4, 4a, 5a, and 5 move confectionary product 3 from an entry point 6, through collecting device 2, to an exit point 8 with no interaction between confectionary product 3 and trays 10,12. More specifically, during normal operating conditions the conveying device 4 moves the confectionary product 3 to an entry point 6, conveying device 4a receives the confectionary product 3 at entry point 6 and moves confectionary product 3 through collecting station 2 to collection space 7, conveying device 5a receives the confectionary product 3 at collection space 7 and moves confectionary product 3 through the remainder of collecting station 2 to exit point 8, and confectionary product 3 is received at exit point 8 by conveying device 5. Conveying device 5 then moves confectionary product 3 beyond an exit point 8, with no interaction between confectionary product 3 and trays 10,12

While being moved by conveying devices 4, 4a, 5a, and 5, confectionary product 3 may be spaced apart on conveying devices 4, 4a, 5a, and 5 to prevent interaction with adjacent sheets and to allow for suitable collection and unloading by collection station 2. During normal operating conditions, without any collection or unloading activity, conveying devices 4, 4a, and 5 may operate at the same transport rate, though the speed of conveying device 5a may ramp up and down to correct the position of confectionary product 3 to properly align confectionary product 3 on the conveying device 5. In order to allow for such adjustments, conveying devices 4, 4a, 5a, and 5 may be servo controlled.

In the event of an operational interruption downstream of collecting station 2 however, it may be determined that the flow of confectionary product 3 must be slowed or halted, and the collecting device 2 may be employed. The means by which the collecting device 2 within the system 1 achieves this collecting will be discussed hereinbelow.

Figure 4:
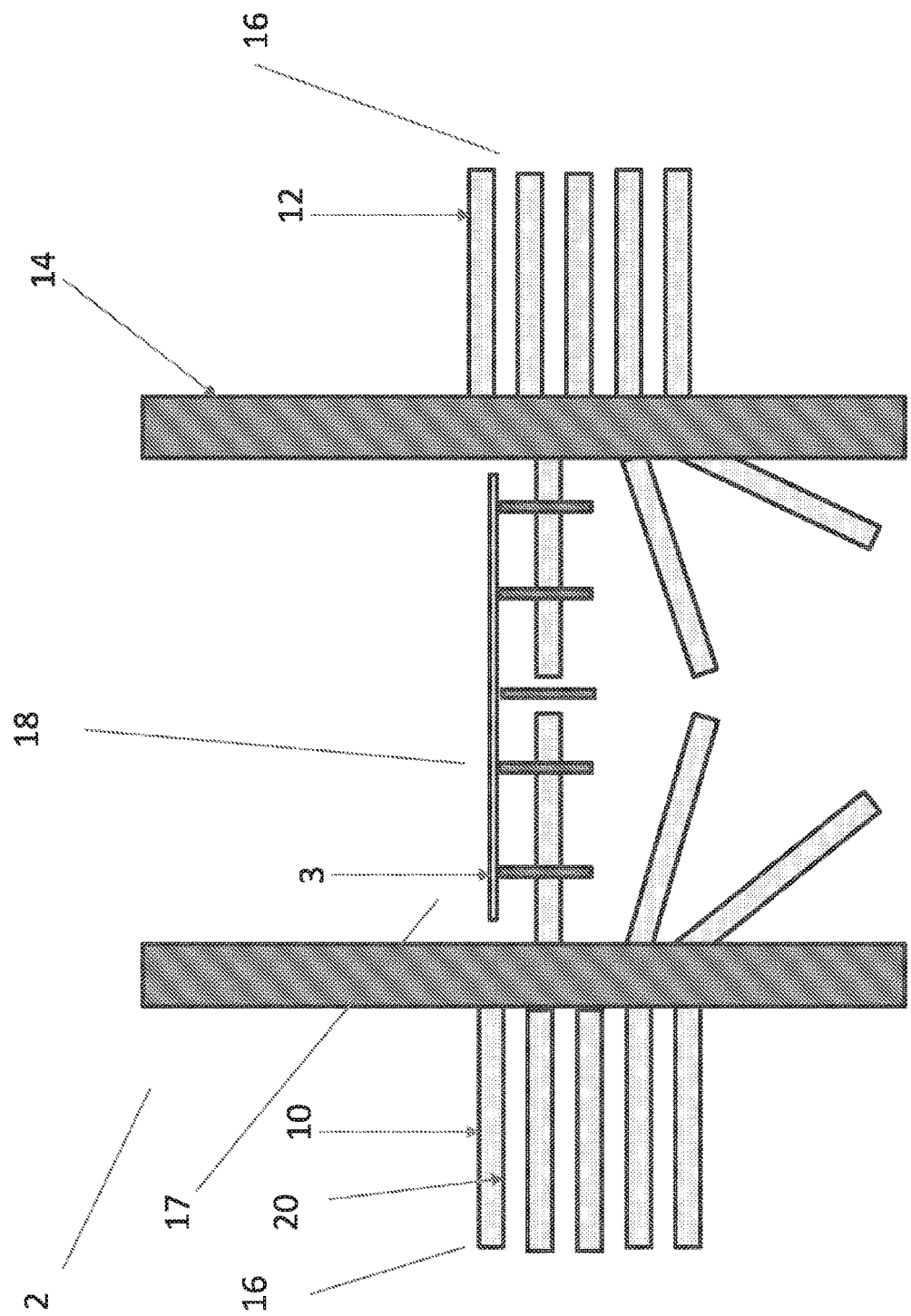
FIG. 4 is a schematic front side elevation view of a collecting station such as that shown in FIG. 2 with no confectionary product collected.
Figure 5:
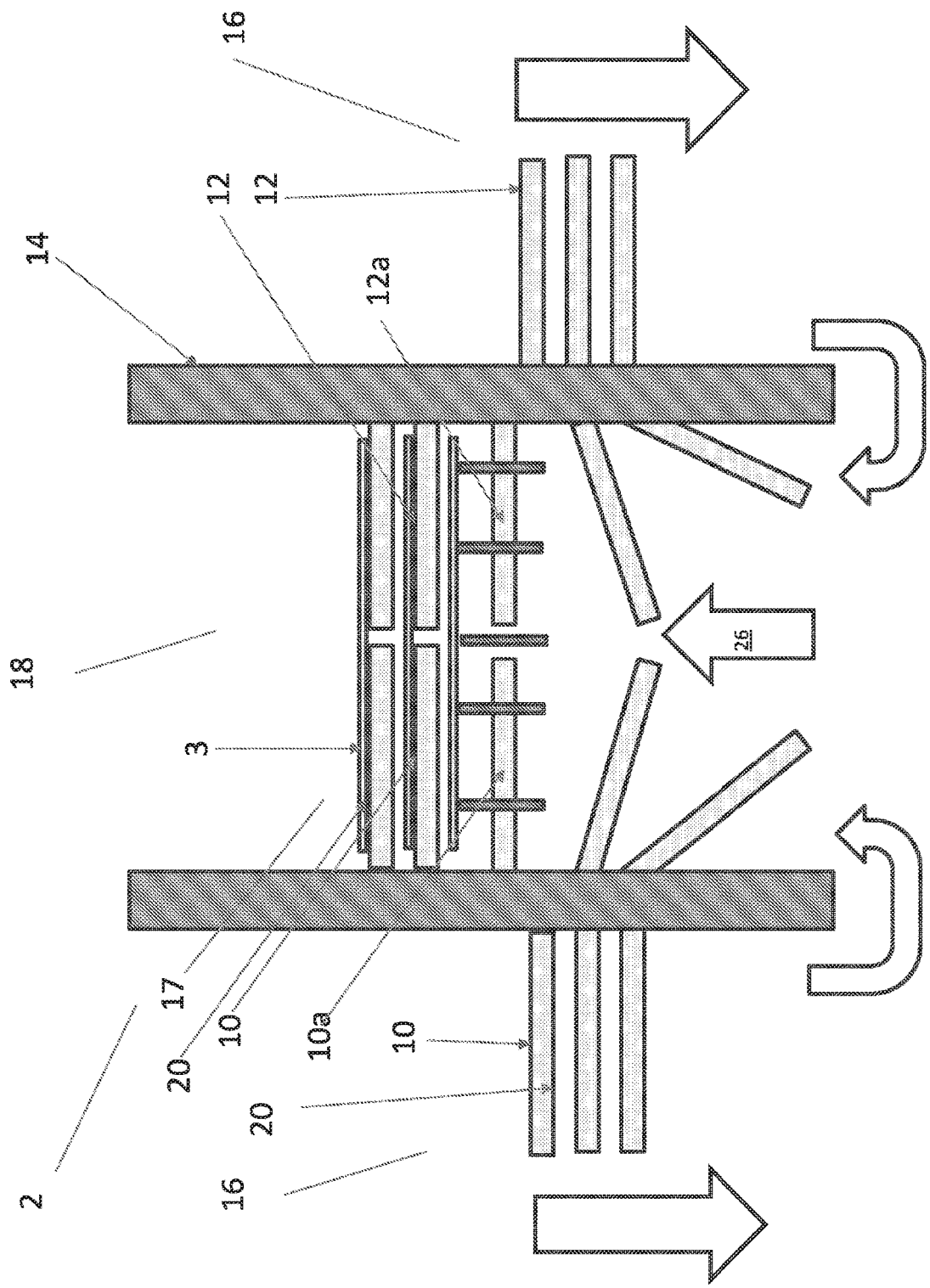
FIG. 5 is a schematic front side elevation view of a collecting station such as that shown in FIG. 2 with a partial capacity of confectionary product collected.

During the production process, the confectionary product 3 is transported to the collecting station 2 by conveying device 4,4a and from the collecting station 2 by conveying device 5a,5. In the exemplary embodiment shown in the Figures, these four conveying devices 4, 4a, 5a, 5 are "spaghetti" type conveying devices, each including multiple parallel belts or bands 9 spaced apart to transport confectionary product 3. As shown best in FIG. 3, the conveying devices 4a, 5a are themselves also spaced from each other at collection space 7. Inclusion of such spaces in length and width directions across the conveying device (or in this embodiment, pair of conveying devices 4a, 5a) in the system 1 allows the trays 10, 12 pass vertically through the conveying device(s) and lift the product sheets 3 from the line. This vertical passing through the conveying devices 4a, 5a and lifting of the sheets 3 is achieved by providing spaces in the trays 10, 12, via inclusion of a tray body 11 and tray extensions 13 in each tray. In an exemplary embodiment, this occurs as follows, the conveying device 4a transports the confectionary product 3 to collection space 7 within collecting station 2. If upstream and downstream stations 22, 24 are running properly, the sheet 3 simply passes over this space 7, from conveyor 4a to conveyor 5a. However, if downstream stations 24 are non-operational, then collecting station 2 is employed. This occurs via a rotation of the trays 10 and the trays 12 from storage outside the frame 14 of the collecting device 2 in outboard area 16, under the still running conveying devices 4a, 5a, and up towards the collecting space 7 in inboard area 18. As shown in FIGS. 4 and 5, this rotation is effectively a 180 degree rotation of each tray 10, 12.

In order to align confectionary product 3 for collection via collecting device 2 and trays 10, 12, conveying devices 4a, 5a may accelerate or otherwise vary their transport speeds in order to properly position the confectionary product 3 on trays 10, 12. This acceleration will act to move sheets 3 on conveyors 4a, 5a a greater distance from sheets on conveyor 4 that are immediately upstream thereof (i.e. sheets that are next in lie to sheets that have arrived at conveyors 4a, 5a). This is demonstrated by the sheet spacing shown in FIG. 1, wherein the sheet 3 shown in the inboard area 18 is shown to be a greater distance from the next sheet in line the sheets that are on conveyor 4. This spacing prevents the trays 10, 12 from lifting one sheet and part of the next sheet in line, which could damage the sheets and create misalignments and delays. Conveying devices 4a, 5a may also operate in a start/stop manner wherein conveying devices 4a, 5a may be stopped instantaneously as trays 10, 12 pass therethrough to prevent the motion of confectionary product 3 as trays 10, 12 interact with confectionary product 3. The amount of acceleration and speed variance of conveying devices 4a, 5a is based on confectionary product 3 position. The variance of the actual position of confectionary product 3 compared to the desired position of confectionary product 3 to be collected by trays 10, 12 may effectively be considered a correction in position error.

Upon reaching the collecting space 7, the trays 10, 12 converge, and pass through the bands 9 of the conveying devices 4a, 5a. More specifically, tray body 11 of each of the trays 10, 12 passes between the collecting space delimiting the conveying devices 4a, 5a, and the extensions 13 of each of the trays 10, 12 pass through the spaces between the bands 9 of conveying device 4a, 5a. As shown in FIG. 5, during the collecting process the trays 10, 12 rotate in an upward direction 26, and trays 10 converge with trays 12 into the same horizontal plane to form a flat surface configured to lift a product sheet 3 passing over the collecting space 7. Simultaneously, while trays 10, 12 continue upwards into storage area 17 the next set of trays 10a, 12a rotate in sequence toward the space 7 in an upward direction 26 to lift the next sheet 3 in line. In at least one embodiment, trays 10, 12 may move at a sufficient speed (and in conjunction with conveyor speed) to lift a properly aligned confectionary product 3 without damaging the lifted product of product immediately upstream thereof (or downstream in the unload condition).

The confectionary product 3 is stored vertically in the storage area 17 above conveying device 4a, 5a, as shown in FIGS. 5 and 6. At maximum capacity of collecting station 2, all trays 10, 12 are disposed in the storage area 17 above conveying devices 4a, 5a, as shown in FIG. 6. Displacement increments or distance between trays 10, 12 may be at least greater than confectionary product 3 thickness. The confectionary product 3 and trays 10, 12 may be in contact with each other during storage in order to optimize space efficiency. In at least one embodiment, the confectionary product 3, when collected, is in contact with the confectionary product interface side 20 of trays 10, 12 on the bottom side of confectionary product 3, while additionally being in contact with the side opposite the confectionary product interface side 20 of another set of trays 10, 12 on the top side of confectionary product 3. Confectionary product 3 can be continued to be collected in a similar manner until the collecting station 2 cannot store any more confectionary product 3, as shown in FIG. 6 or the operational interruption downstream of collecting station 2 has been resolved. A plurality of confectionary product 3 can be stored, scalable with respect to the number of trays 10, 12 available. In at least one embodiment, collecting station 2 has enough trays 10, 12 to collect up to all of confectionary product 3 that enters collecting station 2 during a 2 minute period given a conveying device 4, 4a, 5a, 5 speed and confectionary product 3 frequency.

When the operational interruption downstream of collecting station 2 is resolved, or it is otherwise desired to deposit confectionary product 3 on conveying device 4a, 5a, to be conveyed to downstream processes via conveying device 5, a similar incremental motion is performed, however in reverse. To deposit confectionary product 3 onto conveying device 4a, 5a, the trays 10, 12, oriented with confectionary product interface side 20 facing upwards, are displaced downwardly below the top plane of conveying devices 4a, 5a, depositing the confectionary product 3 on conveying device 4a, 5a. The trays 10, 12 continue to deposit confectionary product 3 at space 7 at appropriate intervals according to the interval distance between sets of trays 10, 12 and a desirable speed, wherein the interval distance between trays 10, 12 is configured to align confectionary product 3 unloaded with confectionary product 3 present on conveying devices 4, 4a, 5a, 5. As the trays 10, 12 are displaced downwardly beyond the top plane of conveying device 4a, 5a, the trays 10, 12 rotate back into the outboard area 16 of collecting station 2. This depositing process continues until the collecting station 2 and trays 10, 12 are free from confectionary product 3, or alternatively until it is determined that there is an operational interruption downstream of collecting station 2. If there is an operational interruption downstream of collecting station 2, then collection of confectionary product 3 may resume with trays 10, 12 as previously described.

After the operational interruption is resolved, and it is determined that the flow of confectionary product 3 can continue downstream, the conveying device 4a, 5a may receive the confectionary product 3 at the collection/deposit point 7 within the collecting station 2, wherein trays 10, 12 may lower the confectionary product 3 to deposit the confectionary product 3 on conveying device 4a, 5a as discussed above. Conveying device 5a may then transport the confectionary product 3 to conveying device 5. Conveying device 5 may then transport the confectionary product 3 to the exit point 8 or further to downstream confectionary production station or process 24. During the unloading process, conveying device 4 and conveying device 5 may operate at 50% normal speed while the inside conveying devices 4a, 5a may accelerate and decelerate to properly align confectionary product 3 as it is unloaded by trays 10, 12 in order to avoid contact with other confectionary product 3 in product flow 28 and generally avoid damage to confectionary product 3. In an alternative embodiment, conveying device 4, conveying device 5, and downstream process 24 may operate at a normal speed, while upstream process 22 may operate at 50% normal speed to allow spaces on conveying devices 4, 4a, 5a, 5 to be created for unloaded sheets to be interspersed between confectionary product 3 not unloaded/deposited by collecting station 2. Conveying devices 4a, 5a, may similarly accelerate and decelerate to properly position unloaded confectionary product 3 via trays 10, 12 to avoid damage and contact with other confectionary product 3. In at least one alternative embodiment, conveying device 4, conveying device 5, and upstream process 22 may operate at normal speed, while downstream process 24 may operate at an elevated speed that is 100% greater than normal speed (when the collecting device is not in use) if possible.

It should be appreciated that trays 10,12, are configured to evenly and adequately support confectionary product 3, wherein confectionary product 3 may be soft, flexible, and/or foldable. In at least one embodiment, fingers 13 are configured have an overall length of 105% to 55% of the overall length of sheet of confectionary product 3 to be collected and deposited. The number of trays 10, 12 may vary according to the storage capacity of collecting station 2. In at least one embodiment, collecting station 2 may have enough trays 10, 12 to collect up to all of confectionary product 3 that may enter collecting station 2 during a 2 minute period given a conveying device 4 speed and confectionary product 3 frequency.

It should also be appreciated that, in at least one embodiment, movement of the trays 10, 12 is actuated by a conveyor type drive. Trays 10, 12 are affixed to the drive/actuator at regular intervals at least greater than confectionary product 3 thickness, wherein all trays 10, 12 may move in generally incremental unison and displacement, albeit the trays 10, 12 are affixed at different positions along the drive/actuator. During normal operating conditions, a set of trays 10, 12 is disposed immediately below the top plane of conveying device 4a, 5a, in the inboard area 18 of collecting station 2, allowing confectionary product 3 to pass through space 7 without any interaction with trays 10, 12.

While the exemplary embodiments of the system discussed to this point are inclusive of "spaghetti" style conveying devices, it should be appreciated that other types of conveying devices, such as but not limited to devices inclusive of unitary belts, may be employed with other types of sheet lifting devices. One such lifting could involve a suction mechanism (for example, one or more suction cups) configured for removably affixing to the gum sheets.

It should be appreciated that the system 1 includes a control system that controls the speed of conveyors 4, 4a, 5a, 5 (particularly acceleration and deceleration of conveying devices 4a, 5a). Further the control system communicates with upstream and downstream processes 22, 24 and accordingly controls the activation, deactivation, loading, and unloading of collecting station 2 and the relative operation speeds of upstream and downstream processes 22, 24. The control system may adjust the rates of upstream and downstream processes 22, 24 to accommodate the introduction of stored or collected confectionary product 3 while collecting device 2 is interspersing the confectionary product 3 with uncollected confectionary product 3 that was uncollected, and further to position the confectionary product 3 generally for suitable collection by collecting device 2.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for processing confectionary product, the system comprising:
   a collecting device disposed in line with at least one upstream confectionary production station disposed upstream of said collecting device and at least one downstream confectionary production station disposed downstream of said collecting device;
   at least one conveying device including a first conveying device configured to convey the confectionary product from said at least one upstream confectionary production station to said collecting device and a second conveying device configured to convey the confectionary product from said collecting device to said at least one downstream confectionary production station;
   wherein said at least one conveying device continuously conveys the confectionery product from an upstream production station to said collecting device when said downstream production station is in both operational and non-operational;
   wherein said collecting device is configured to collect confectionary product from said first conveying device while said at least one upstream confectionary station is operational and said at least one downstream confectionary production station is non-operational;
   wherein said collecting device is configured to deposit the collected confectionary product onto said at least one conveying device when said downstream confectionary production station is operational, the collected confectionary product being deposited onto the at least one conveying device interspersed with the confectionary product output from the upstream confectionary production station; and
   wherein during deposit of the collected confectionary product onto said at least one conveying device a speed of said second conveying device is greater than a speed of said first conveying device.

2. The system of claim 1, wherein said at least one conveying device further comprises a third conveying device and a fourth conveying device configured to align the confectionary product and convey the confectionary product to said collecting device, wherein said third conveying device and said fourth conveying device are configured to receive the confectionary product from said collecting device.

3. They system of claim 1, wherein said at least one conveying device is operationally controlled relative to production from said at least one upstream process station to space apart the confectionary product in a manner that allows for suitable collection.

4. The system of claim 1, wherein said at least one conveying device is at least two conveying devices that are operationally controlled to accelerate and decelerate to space apart the confectionary product in a manner that allows for suitable collection.

5. The system of claim 1, wherein said collecting device includes a plurality of trays configured to collect the confectionary product from said at least one conveying device said plurality of trays being configured to move at a speed to collect the confectionary product without stopping said at least one conveying device.

6. The system of claim 1, wherein said collecting device is configured to deposit the confectionary product on said at least one conveying device when said downstream confectionary production station is operational.

7. The system of claim 1, wherein said collecting device is further configured to store confectionary product in a vertical tray arrangement.

8. The system of claim 1, wherein said at least one conveying device includes a plurality of bands spaced apart across a width of said at least one conveying device.

9. The system of claim 8, wherein said at least one conveying device is at least one first conveying device and at least one second conveying device, said at least one first conveying device and said at least one second conveying device converge at a collecting space delimiting said at least one first conveying device from said at least one second conveying device.

10. The system of claim 9, wherein said collecting device includes a plurality of trays, and wherein said trays are shaped and configured to pass vertically through said at least one first conveying device and said at least one second conveying device via spaces between said bands and said collecting space.

11. The system of claim 1, wherein said collecting device is further configured to collect confectionary product from said conveying device with a suction mechanism.

12. A method for processing confectionary product, the method comprising:
   providing a collecting device, at least one upstream confectionary production station disposed upstream of said collecting device, and at least one downstream confectionary production station disposed downstream of said collecting device, wherein said at least one upstream confectionary production station cools the confectionary product and said at least one downstream confectionary production station packages the confectionary product;
   continuously conveying the confectionary product from said at least one upstream confectionary production station to a collecting device via at least one conveying device when said downstream production station is in both operational and non-operational;
   collecting confectionary product from said at least one conveying device in said collecting device while said at least one upstream confectionary production station is operational, and while at least one downstream confectionary production station is non-operational; and
   depositing said collected confectionary product from said collecting device onto said at least one conveying device and conveying the confectionary product from said collecting device to said at least one downstream production station via said at least one conveying device when said at least one downstream production station is operational, said depositing said collected confectionary product from said collecting device onto said at least one conveying device including interspersing said collected confectionery product with the confectionary product output from the upstream confectionary production station;
   wherein said at least one conveying device includes a first upstream conveying device and a second downstream conveying device and during said depositing said collected confectionary product onto said at least one conveying device a speed of said downstream conveying device is greater than a speed of said upstream conveying device.

13. The method of claim 12, wherein said conveying of the confectionary product from said at least one upstream confectionary production station to a collecting device being at least partially performed by said first upstream conveying device, and said conveying of the confectionary product from said collecting device to said at least one downstream production station being at least partially performed by said second downstream conveying device.

14. The method of claim 12, wherein said at least one conveying device is a first upstream conveying device, a second downstream conveying device, a third conveying device, and a fourth conveying device, said conveying of the confectionary product from said at least one upstream confectionary production station to a collecting device being performed at least partially by said first upstream conveying device, said conveying of the confectionary product from said collecting device to said at least one downstream production station being performed at least partially by said second downstream conveying device, and said transferring of the confectionary product from said collecting device occurring at said third conveying device and said fourth conveying device, the method aligning the confectionary product for said collecting using said third conveying device and said fourth conveying device.

15. The method of claim 12, further including spacing apart the confectionary product in a manner that allows for suitable collection via said at least one conveying device operationally controlled relative product from said at least one upstream process station.

16. The method of claim 12, wherein said at least one conveying device is at least two conveying devices, further including spacing apart the confectionary product in a manner that allows for suitable collection via said at least two conveying devices that are operationally controlled to accelerate and decelerate.

17. The method of claim 12, wherein said collecting device includes a plurality of trays moveable at a speed that allows collection of the confectionary product without stopping said at least one conveying device.

18. The method of claim 12, further including storing the confectionary product in a vertical tray arrangement.

19. The method of claim 12, wherein said at least one conveying device includes a plurality of bands spaced apart across a width of said at least one conveying device.

20. The method of claim 19, wherein said at least one conveying device is at least one first conveying device and at least one second conveying device, said at least one first conveying device and said at least one second conveying device converge at a collecting space delimiting said at least one first conveying device from said at least one second conveying device.

21. The method of claim 20, wherein said collecting device includes a plurality of trays, and wherein said trays are shaped and configured to pass vertically through said at least one first conveying device and said at least one second conveying device via spaces between said bands and said collecting space.

22. The method of claim 12, wherein said collecting confectionary product is performed via suction mechanism.

23. A system for processing gum, the system comprising:
a collecting device disposed in line with a forming device configured to form gum into a continuous sheet of final gum thickness and divide said continuous sheet into individual sheets and at least one downstream confectionary production station configured to score or package said individual sheets;
at least one conveying device including a first conveying device configured to convey the gum from said forming device to said collecting device; and a second conveying device configured to receive the gum from said collecting device, and convey the gum from said collecting device to said at least one downstream confectionary production station;
wherein said at least one conveying device continuously conveys the gum from an upstream production station to said collecting device when said downstream production station is in both operational and non-operational;
wherein said collecting device is configured to collect gum from said conveying device while said forming device is operational and said at least one downstream confectionary production station is non-operational;
wherein said collecting device is configured to deposit the collected gum onto said at least one conveying device while said at least one downstream confectionary production station is operational, the collected gum being deposited onto the at least one conveying device interspersed with the gum output from the upstream confectionary production station; and
wherein during deposit of the gum product onto said at least one conveying device, a speed of the second conveying device is greater than a speed of the first conveying device.

24. The system of claim 23, wherein said collecting device is configured to deliver and intersperse the gum that is collected with an uncollected gum while said forming device is operational and said at least one downstream confectionary production station is operational.

25. The system of claim 23, further comprising a control system configured to activate/deactivate the collecting device, adjust rates of said forming device, said at least one conveying device, and said at least one downstream confectionary production station to position the gum for said collecting device.

26. The system of claim 25, further comprising a control system configured activate/deactivate the collecting device, to adjust rates of said forming device, said at least one conveying device, and said at least one downstream confectionary production station to accommodate the introduction of collected gum while said collecting device is interspersing the gum.

* * * * *